United States Patent
Mizutani et al.

(10) Patent No.: US 8,208,165 B2
(45) Date of Patent: Jun. 26, 2012

(54) IMAGE FORMING APPARATUS WITH USER AUTHENTICATION

(75) Inventors: Akihiro Mizutani, Tokyo (JP); Kazuhiro Ogura, Fujisawa (JP); Shinji Makishima, Tokyo (JP); Toshihiro Ida, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/228,161

(22) Filed: Sep. 8, 2011

(65) Prior Publication Data
US 2011/0317203 A1   Dec. 29, 2011

Related U.S. Application Data

(63) Continuation of application No. 12/704,834, filed on Feb. 12, 2010, now Pat. No. 8,035,840, which is a continuation of application No. 11/302,146, filed on Dec. 14, 2005.

(51) Int. Cl.
*G06F 3/12* (2006.01)
(52) U.S. Cl. ...... 358/1.15; 358/1.13; 358/1.14; 358/1.16
(58) Field of Classification Search .......... 358/1.14, 358/1.15, 1.16, 1.13; 399/80, 82, 83; 705/71–77; 713/166, 170, 165
See application file for complete search history.

(56) References Cited

U.S. PATENT DOCUMENTS

| | | |
|---|---|---|
| 5,970,218 A | 10/1999 | Mullin et al. |
| 6,184,996 B1 | 2/2001 | Gase |
| 6,388,687 B1 | 5/2002 | Brackett et al. |
| 6,567,179 B1 * | 5/2003 | Sato et al. .......... 358/1.15 |
| 6,667,810 B1 | 12/2003 | Jeyachandran et al. |
| 6,771,386 B1 | 8/2004 | Kato |
| 6,894,800 B2 | 5/2005 | Sugaya |
| 6,976,072 B2 | 12/2005 | Mathieson |
| 7,180,626 B1 * | 2/2007 | Gassho et al. .......... 358/1.6 |
| 7,239,409 B2 | 7/2007 | Parry |
| 7,284,061 B2 | 10/2007 | Matsubayashi et al. |
| 7,313,699 B2 | 12/2007 | Koga |
| 7,480,069 B2 | 1/2009 | Yoshida et al. |

(Continued)

FOREIGN PATENT DOCUMENTS

JP   2004-268535 A   9/2004

OTHER PUBLICATIONS

A. Mizutani, U.S. PTO Notice of Allowance and Allowability, U.S. Appl. No. 11/302,146, dated Aug. 18, 2011, 9 pages.

(Continued)

*Primary Examiner* — Twyler Haskins
*Assistant Examiner* — Dennis Dicker
(74) *Attorney, Agent, or Firm* — Foley & Lardner LLP

(57) ABSTRACT

An image forming apparatus spools normal print requests received from external equipment as normal print jobs which are sequentially executed by a printer, spools a private print request received from an external equipment in a spooler as a private print job executed by a printer in response to an instruction by a user who has requested the private print, and changes a normal print job in an execution waiting state of the user which is spooled in the spooler to a private print job of the user in response to a request from the user authenticated by a user authenticating portion.

14 Claims, 9 Drawing Sheets

U.S. PATENT DOCUMENTS

| | | |
|---|---|---|
| 7,545,525 B2 | 6/2009 | Idehara |
| 7,609,404 B2 | 10/2009 | Nakahashi |
| 7,889,375 B2 | 2/2011 | Kujirai et al. |
| 2002/0171859 A1 | 11/2002 | Chen et al. |
| 2002/0186410 A1* | 12/2002 | Tanaka .................. 358/1.15 |
| 2003/0226464 A1* | 12/2003 | Mathieson ................ 101/484 |
| 2004/0008363 A1 | 1/2004 | Suzuki et al. |
| 2004/0136030 A1* | 7/2004 | Gassho .................. 358/1.15 |
| 2004/0156068 A1 | 8/2004 | Yoshida et al. |
| 2004/0190038 A1 | 9/2004 | Shahindoust |
| 2006/0007482 A1 | 1/2006 | Nakahashi |
| 2006/0010248 A1 | 1/2006 | Daos et al. |

OTHER PUBLICATIONS

Akihiro Mizutani, U.S. PTO Office Action, U.S. Appl. No. 11/302,146, dated Apr. 28, 2010, 12 pages.

Akihiro Mizutami, U.S. PTO Final Office Action, U.S. Appl. No. 11/302,146, dated Oct. 14, 2010, 12 pages.

Akihiro Mizutani, U.S. PTO Office Action, U.S. Appl. No. 11/302,146, dated Mar. 1, 2011, 12 pages.

A. Mizutani, U.S. PTO Notice of Allowance, U.S. Appl. No. 11/302,146, dated Nov. 23, 2011, 9 pages.

\* cited by examiner

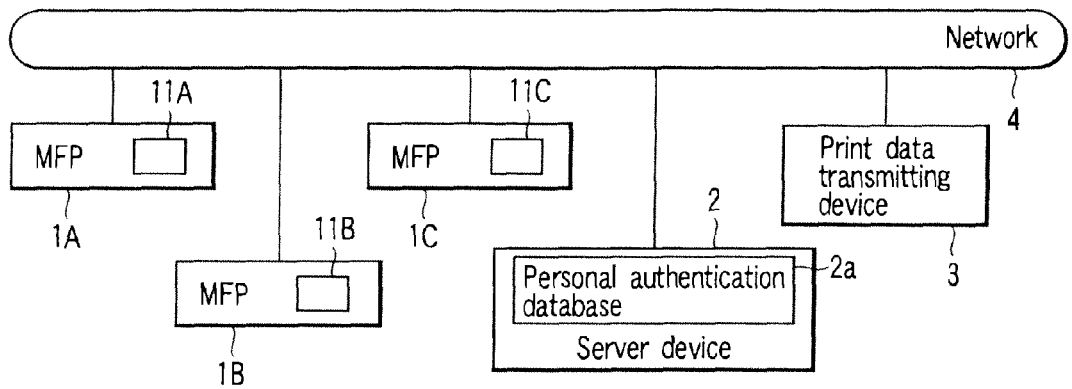
FIG. 1
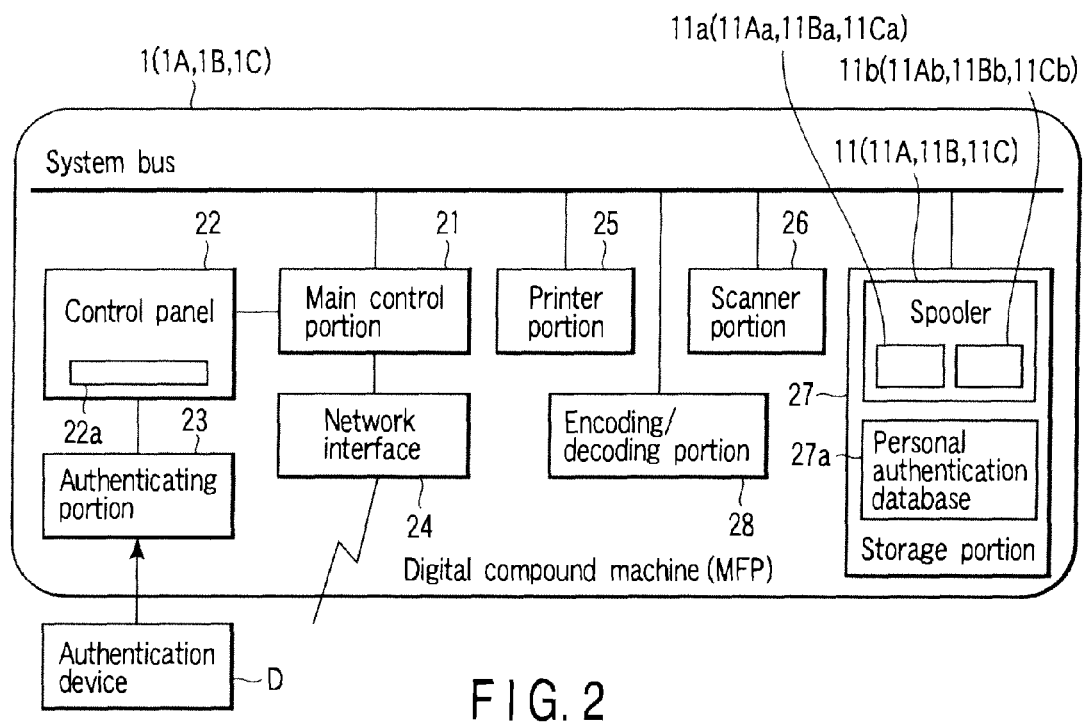
FIG. 2
| Worker's number | 000111 | 000112 | 000113 | |
|---|---|---|---|---|
| Card ID | 000102···07 | 08090a···0f | 1f2e3d···78 | |
| Authentication data | ****** | ****** | ****** | |
FIG. 3

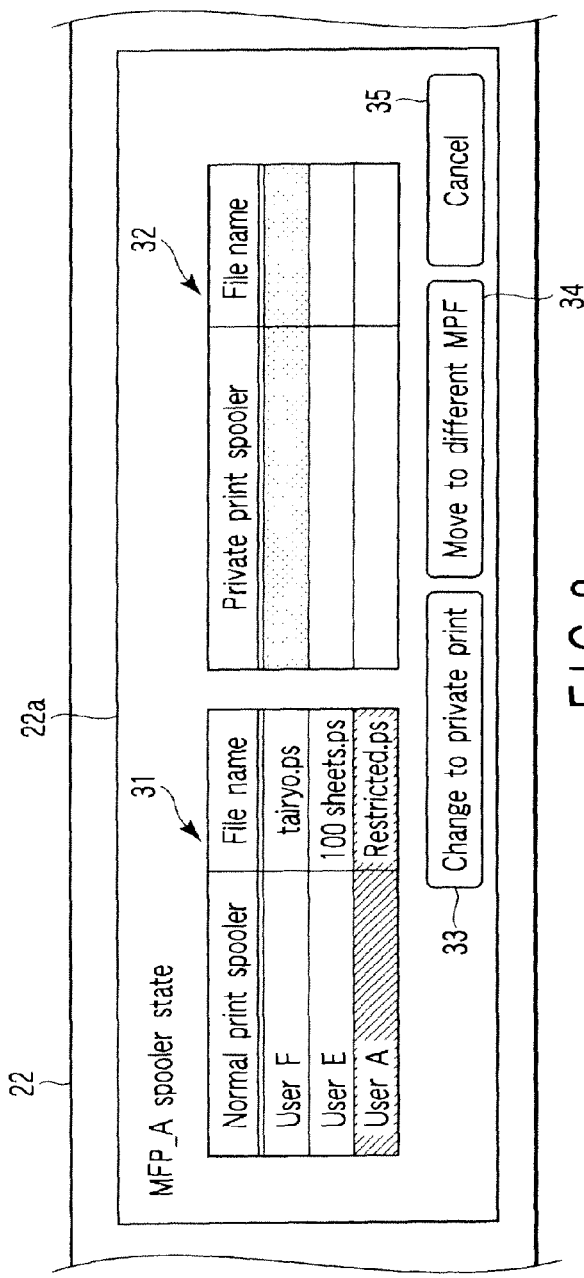
F I G. 8
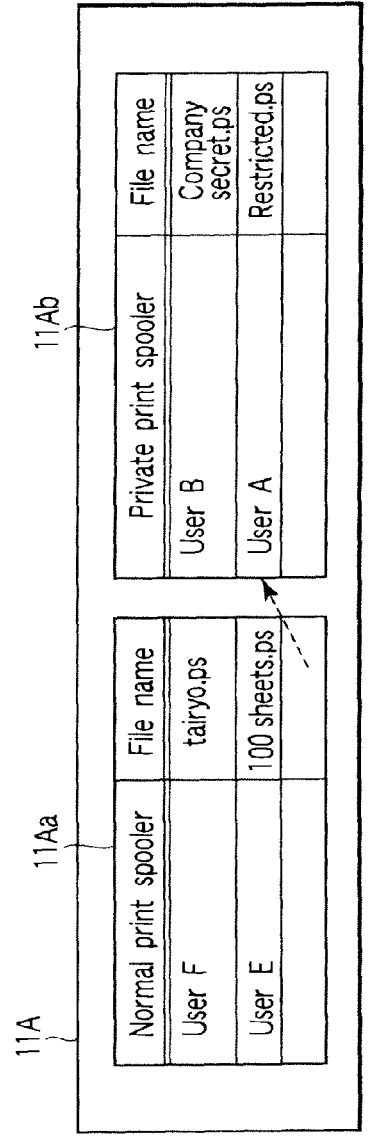
F I G. 9

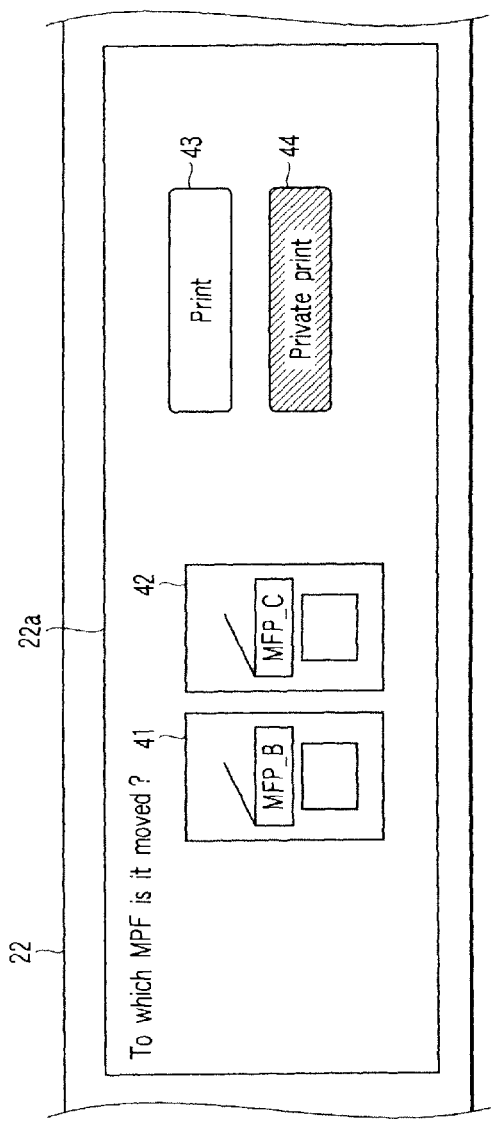
FIG. 13
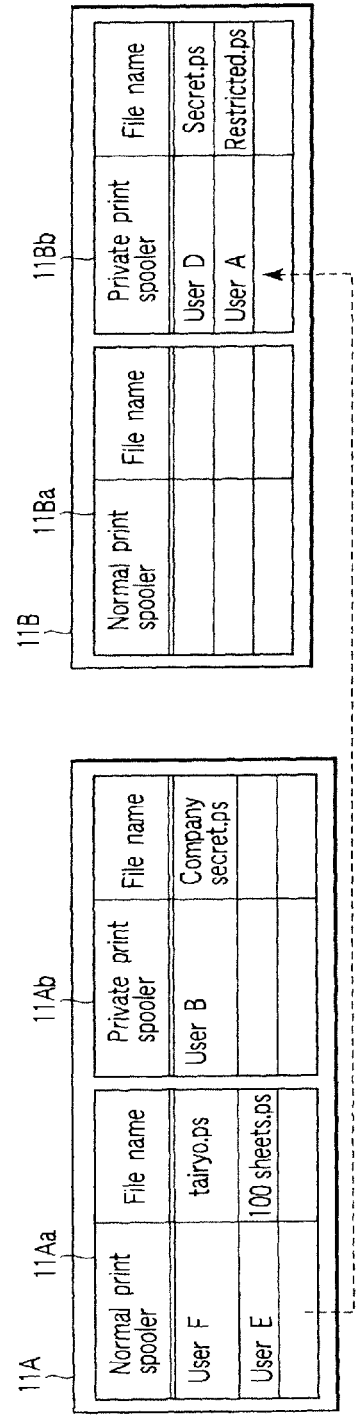
FIG. 14A
FIG. 14B

IMAGE FORMING APPARATUS WITH USER AUTHENTICATION

CROSS-REFERENCE TO RELATED APPLICATIONS

This application is a Continuation of U.S. application Ser. No. 12/704,834, filed Feb. 12, 2010, which is a Continuation of U.S. application Ser. No. 11/302,146, filed Dec. 14, 2005, the entire contents of which is incorporated herein by reference.

BACKGROUND OF THE INVENTION

1. Field of the Invention

This invention relates to an image forming apparatus which performs an image forming process in response to a print request from terminal equipment connected via a network in a network print system, for example.

2. Description of the Related Art

Conventionally, in a network print system, terminal equipment operated by the user and a printer are connected via a network. In such a network system, the printer performs a print process (network printing) in response to a print request from each terminal equipment unit connected via the network. Further, in the network printing, a normal print and private print are provided.

The normal print is to permit a printer which has received requests of the normal print to sequentially perform print processes. That is, the printer sequentially performs the print processes in response to normal print requests from terminal equipment operated by users. Therefore, a user who has requested a normal print by the terminal equipment forgets to fetch the print result in some cases. Further, in the case where the printer which has received the normal print request is performing another print process, the print process for the normal print request is performed after the above print processes. Therefore, there occurs a possibility that the user will erroneously take away his own print result and the other's print result together.

On the other hand, the private print is performed by causing a user who has requested the private print by the terminal equipment to go to the installation location of the printer and directly instruct the printer to start the private print. That is, the printer holds the private print request from the terminal equipment which the user operates. The printer which holds the private print request performs the private print in response to an instruction of the private print start directly from the user. In the above private print, it is assumed that the user who directly instructs the printer to start the private print is near the printer while the printer is performing the private print. Therefore, in the private print, forgetting to take the print result or carrying-away of the print result by others can be prevented and the security of the print result can be enhanced.

For example, in Jpn. Pat. Appln. KOKAI Publication No. 2004-268535, the technique for preventing the user who requested the private print from being kept waiting by another print process when he went to the installation location of the print device is described. In Jpn. Pat. Appln. KOKAI Publication No. 2004-268535, the user transmits inhibition of an operation by the other user together with the request of the private print from the terminal equipment to the print device. As a result, in the print device, the private print request is held and the other user can be prevented from performing an operation.

However, in the technique of the private print described in Jpn. Pat. Appln. KOKAI Publication No. 2004-268535, the following problems occur.

(1) Another user cannot use the printer until the private print is performed instead of preventing the user who has instructed the private print from being kept waiting by the other user. That is, in a period from the time when a certain user instructs the private print for the printer until the time the user instructs execution of the private print in the printer, other users cannot use the printer.

(2) In the case where the print process of another user is performed when the private print is requested, the private print cannot be performed in the printer until the print process is terminated. That is, if a print (for example, a large amount of prints) which takes a long time is being performed when the private print is requested, the user who has requested the private print will be kept waiting for a long time until the process is terminated.

BRIEF SUMMARY OF THE INVENTION

An image forming apparatus according to one aspect of this invention comprises a user authenticating portion which authenticates a user, an interface which receives a print request from an external equipment, a spooler which spools a normal print request received by the interface as a normal print job and spools a private print request received by the interface as a private print job, a printer which sequentially executes normal print jobs spooled in the spooler and executes a private print job spooled in the spooler in response to an execution request from the user authenticated by the user authenticating portion, and a controller which changes the normal print job spooled in the spooler and kept waiting for execution to a private print job in response to a request from the user authenticated by the user authenticating portion.

An image forming apparatus according to one aspect of this invention comprises a user authenticating portion which authenticates a user, a first interface which performs data communication with another image forming apparatus, a second interface which receives a print request from an external equipment, a spooler which spools a print request received by the second interface, a printer which executes a print job spooled in the spooler, and a controller which moves the print job in an execution waiting state of the user which is spooled in the spooler to a spooler of another image forming apparatus connected via the first interface in response to a request from the user authenticated by the user authenticating portion.

An image forming method according to one aspect of this invention comprises spooling a normal print request as a normal print job in a spooler when it is received from an external equipment, spooling a private print request as a private print job in the spooler when it is received from an external equipment, sequentially executing normal print jobs spooled in the spooler, authenticating a user, executing a private print job spooled in the spooler in response to an execution request from the authenticated user, and changing the normal print job in an execution waiting state which is spooled in the spooler to a private print job of the user in response to a request from the authenticated user.

An image forming method according to one aspect of this invention comprises spooling a received print request as a print job in a spooler when the print request is received from an external equipment, executing a print job spooled in the spooler, authenticating a user, and moving a print job spooled in the spooler and kept waiting for execution to a spooler of another image forming apparatus which is data communicable in response to a request from the authenticated user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram schematically showing the whole configuration of a network print system.

FIG. 2 is a block diagram schematically showing an example of the configuration of a digital multifunction machine as an image forming apparatus.

FIG. 3 is a diagram showing an example of the configuration of a personal authentication database.

FIG. 8 is a view showing an example of a display screen of a spooler state displayed on the display portion.

FIG. 9 is a diagram showing an example of a print job stored in the spooler.

FIG. 12A is a diagram showing an example of a print job stored in the spooler of the digital multifunction machine of the moving source.

FIG. 12B is a diagram showing an example of a print job stored in the spooler of the digital multifunction machine of the moving destination.

FIG. 13 is a view showing a display example of a selection screen of the moving destination.

FIG. 14A is a diagram showing an example of a print job stored in the spooler of the digital multifunction machine of the moving source.

FIG. 14B is a diagram showing an example of a print job stored in the spooler of the digital multifunction machine of the moving destination.

DETAILED DESCRIPTION OF THE INVENTION

Figure 4:
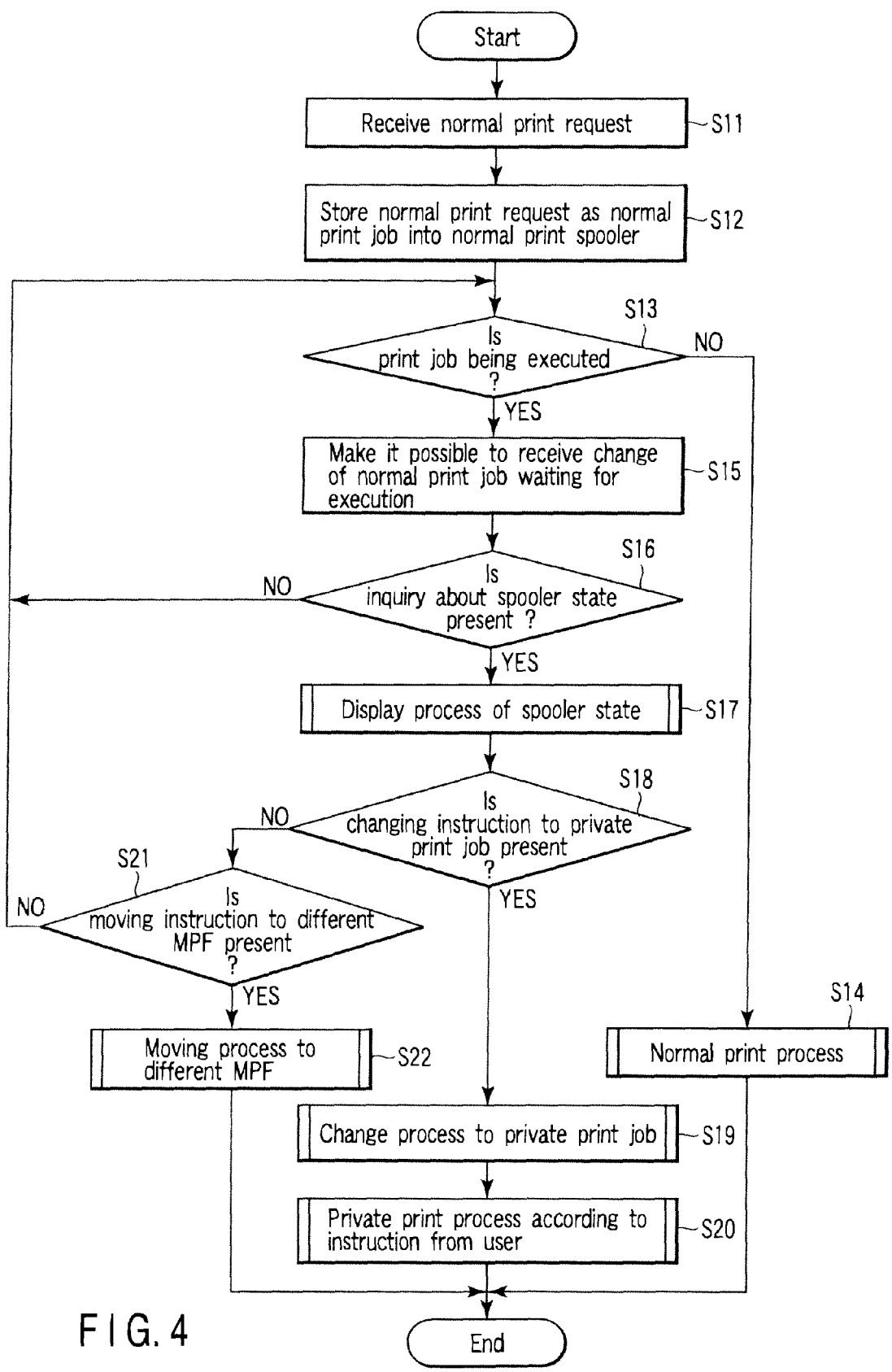
FIG. 4 is a flowchart for illustrating a print job changing process in the digital multifunction machine.

There will now be described an embodiment of this invention with reference to the drawings.

First, a network print system according to en embodiment of this invention is explained.

FIG. 1 is a diagram schematically showing the whole configuration of the network print system.

As shown in FIG. 1, the network print system has digital multifunction machines 1 (1A, 1B, 1C), server device 2 and print data transmitting device 3 connected via a network 4.

The digital multifunction machine (multifunction peripherals [MFP]) 1 functions as an image forming apparatus. Further, as the image forming apparatus, a network printer or the like can be used. The digital multifunction machine 1 has a function (network printing function) of performing a print process in response to a request from the print data transmitting device 3 or the like via the network 4. In this case, the digital multifunction machine 1 may receive the print request from the print data transmitting device 3 without using the network 4.

Further, the digital multifunction machine 1 also has a function of performing data communication with another digital multifunction machine and server device 2 via the network 4.

Further, the digital multifunction machines 1 (1A, 1B, 1C) respectively have spoolers 11 (11A, 11B, 11C) which spool print jobs. The spooler 11 stores a print request containing print data which the digital multifunction machine 1 has received from the print data transmitting device 3 as a print job. Further, the digital multifunction machine 1 executes the print jobs accumulated in the spooler 11 in a preset order or according to an instruction from the user.

The server device 2 stores data to perform user authentication in the digital multifunction machines 1 (1A, 1B, 1C). The server 2 includes a personal authentication database 2a in which user information containing authentication data of each user is accumulated.

The print data transmitting device 3 is terminal equipment which is a transmission source of a print request containing print data. The print data transmitting device 3 can be used if it can transmit a print request to the digital multifunction machine 1. For example, the print data transmitting device 3 is realized by a personal computer (PC), portable terminal equipment or the like.

Next, an example of the configuration of the digital multifunction machine 1 is explained.

FIG. 2 is a block diagram schematically showing an example of the configuration of the digital multifunction machine 1.

As shown in FIG. 2, the digital multifunction machine 1 includes a main control portion 21, control panel 22, authenticating portion 23, network interface 24, printer portion 25, scanner portion 26, storage portion 27 and encoding/decoding portion 28 and the like.

The main control portion 21 controls the whole portion of the digital multifunction machine 1. The main control portion 21 has a function of controlling the respective portions. Further, the main control portion 21 includes a central processing unit (CPU), random access memory (RAM), read-only memory (ROM), nonvolatile memory and image processing portion and the like. The main control portion 21 realizes various functions or various processes by causing the CPU to execute control programs stored in the ROM, nonvolatile memory or HDD 27 or the like.

The control panel 22 is a user interface to which operation instructions are input from the user. The control panel 22 includes a display portion 22a configured by a display device containing a touch panel and a hard key such as a ten key. On the display portion 22a of the control panel 22, operation guidance or touch key or the like is displayed. The control panel 22 detects an input to the touch key by the touch panel displayed on the display portion 22a and informs this to the main control portion 21.

The authenticating portion 23 acquires authentication information of the user from the user. In the main control portion 21, a user authentication process is performed based on authentication information of the user acquired by the authenticating portion 23. In this case, the authenticating portion 23 performs the user authentication process based on authentication information acquired and may inform the main control portion 21 of the authentication result.

The authenticating portion 23 can be used if it can acquire authentication information of the user and is realized by a device corresponding to an operation form of authentication information of the user. For example, authentication information of the user may be stored in an IC card which each user has. In this case, the authenticating portion 23 is configured by an IC card reader which reads authentication information from the IC card. Further, as the authentication information of the user, it is permissible to use biometric information of the user (for example, fingerprint, voiceprint, face image, iris of an eye, vein pattern of the palm or the like). In this case, the authenticating portion 23 is configured by a living biometric acquiring device which acquires biometric information from the user.

The network interface 24 is an interface which performs data communication with external equipment. For example, the network interface 24 is configured by a network interface card (NIC) or the like which performs data communication with another digital multifunction machine 1, server device 2 or print data transmitting device 3 via the network 4.

The printer portion 25 forms an image on an image-forming medium. In the present embodiment, the printer portion 25 performs a print process based on the print job spooled in the spooler 11 based on control of the main control portion 21. For example, the printer portion 25 is configured by a feeding portion (not shown in the drawing) which feeds an image-forming medium, an image forming portion (not shown in the drawing) which forms a color image or monochrome image on the image-forming medium fed by the feeding portion and the like.

The storage portion 27 stores various data items. For example, the storage portion 27 is configured by an HDD. The storage portion 27 includes a spooler 11 and personal authentication database 27a.

The encoding/decoding portion 28 performs an encoding process or decoding process. For example, the encoding/decoding portion 28 encodes data to be transmitted to another digital multifunction machine when data to be transmitted to another digital multifunction machine is encoded. Further, the encoding/decoding portion 28 decodes encoded data when the encoded data is received from another digital multifunction machine.

The spooler 11 spools a print request from the print data transmitting device 3 on the network 4 as a print job. The spooler 11 includes a normal print spooler 11a and private print spooler 11b. The normal print spooler 11a stores a print job (normal print job) as a normal print. The private print spooler 11b stores a print job (private print job) as a private print.

The personal authentication database 27a is a database which stores user information containing authentication information of the user. For example, in the personal authentication database 27a, user ID and authentication information of each user are set in correspondence and stored. The user ID is identification information of each user. The authentication information is data to perform a user authentication process which authenticates whether or not he is a user specified by the user ID. The authentication information corresponds to data acquired by the authenticating portion 23. For example, as described above, a password or biometric information is used for the authentication information.

In this case, as shown in FIG. 1, the personal authentication database 27a may be provided on other equipment (server device 2) on the network 4. That is, it is sufficient if the personal authentication database 27a is installed so that the digital multifunction machine 1 can acquire it at the time of the user authentication process.

FIG. 3 is a diagram showing an example of the configuration of the personal authentication databases 27a, 2a.

FIG. 3 shows an example of the configuration of the personal authentication database 27a (or 2a) in the operation form of performing the user authentication process by an IC card. In the example shown in FIG. 3, workers' numbers, card IDs and authentication data items are set in correspondence and stored. A worker's number is user identification information to specify the user. The card ID is card identification information to specify a card which each user has. The authentication data is information to authenticate the user.

The digital multifunction machine 1 can specify the user based on card ID read out from the IC card by the authenticating portion 23 with reference to the personal authentication database 27a described above. Further, the digital multifunction machine 1 can perform user authentication by collating input data input by the user by use of the control panel 22 or the like and authentication data stored in the personal authentication database 27a.

Next, a storage process of a print job into the spooler 11 is explained.

First, the print data transmitting device 3 transmits a print request to the digital multifunction machine 1 in response to an operation of the user. For example, when the digital multifunction machine 1A is caused to perform the normal print, the print data transmitting device 3 transmits a normal print request containing information indicating a user and print data to the digital multifunction machine 1A. Further, when the digital multifunction machine 1A is caused to perform the private print, the print data transmitting device 3 transmits a private print request containing information indicating a user and print data to the digital multifunction machine 1A based on the specification of the private print by the user.

The digital multifunction machine 1A receives the print request (normal print request or private print request) from the print data transmitting device 3 by the network interface 24. When the print request from the print data transmitting device 3 is received, the main control portion 21 of the digital multifunction machine 1 determines whether the received print request is the normal print request or the private print request.

When it is determined that the print request received by the network interface 24 is the normal print request, the main control portion 21 stores the normal print request into the normal print spooler 11a as a normal print job. The normal print jobs stored in the normal print spooler 11Aa are executed in an order in which the normal print requests are received. For this purpose, in the normal print spooler 11a, the normal print jobs are stored in an order in which the normal print requests are received. For example, in a case where a normal print job which is being executed or waits for execution already exists when the normal print request is received, the main control portion 21 stores the normal print job of the received normal print request in the normal print spooler 11a so as to print it after the normal print jobs.

Further, when it is determined that the print request received by the network interface 24 is the private print request, the main control portion 21 stores the private print request into the private print spooler 11b as a private print job.

The private print job stored in the private print spooler 11b is executed in response to an execution request which the user who requests the private print inputs to the control panel 22.

Further, in the spooler 11 (normal print spooler 11a or private print spooler 11b), at least information indicating the user and information indicating the print data are stored as information to manage the print job (normal print job or private print job).

Information indicating the user may be information if it can specify the user. For example, when the personal authentication database 27a has a configuration as shown in FIG. 3, information indicating the user may be a worker's number (user ID) to specify the user or may be card ID to specify the IC card which the user has.

Further, information indicating print data is sufficient if it indicates data to be printed. For example, as information indicating print data, a file name of data to be printed may be used. In this case, the main body of the print data (for example, the file of data to be printed) may be stored in the storage portion 27 or may be stored in equipment (for example, the server device 2) which the digital multifunction machine 1 can access.

Next, a print process based on the print job stored in the spooler 11 is explained.

In the digital multifunction machine 1, a print process based on the print job stored in the spooler 11 is performed. Further, the storage process of the print job into the spooler 11 is performed in parallel with the print process based on the print job stored in the spooler 11.

That is, the main control portion 21 of the digital multifunction machine 1A monitors whether or not a normal print job exists in the normal print spooler 11a. If a normal print job exists in the normal print spooler 11a, the main control portion 21 sequentially executes normal print jobs stored in the normal print spooler 11a.

Further, the private print is executed in response to a request from the user authenticated by the user authentication process. The user authentication process is a process of authenticating (specifying) a user as an operator. If the user is authenticated by the user authentication process, the main control portion 21 sets the private print job of the authenticated user among the private print jobs stored in the private print spooler 11b into a selectable state.

For example, the main control portion 21 displays a selection screen of the private print job on which the private print job of the authenticated user is set in the selectable state on the display portion 22a. If the private print job to be executed by the authenticated user is selected on the selection screen, the main control portion 21 executes the selected private print job.

Next, a changing process for the print job in the digital multifunction machine 1 is explained.

In this case, as the changing process for the print job, a process (a changing process into the private print) of changing the normal print in an execution waiting state into a private print process or a process (a moving process to a different digital multifunction machine) of changing a print job in an execution waiting state to a print job of a different digital multifunction machine is performed.

First, the changing process for the print job waiting for execution is schematically explained.

FIG. 4 is a flowchart for illustrating the changing process for the print job set in an execution waiting state in the digital multifunction machine 1.

In this case, in the system configuration as shown in FIG. 1, it is assumed that the digital multifunction machine 1A receives a normal print request from the print data transmitting device 3.

First, it is assumed that a normal print request is received from the print data transmitting device 3 to the digital multifunction machine 1A via the network 4. Then, the digital multifunction machine 1A receives the normal print request from the print data transmitting device 3 by the network interface 24 (step S11).

If the normal print request from the print data transmitting device 3 is received by the network interface 24, the main control portion 21 stores the normal print request as a normal print job into the normal print spooler 11Aa (step S12). At this time, information indicating a user and information indicating print data are stored as a normal print job into the normal print spooler 11Aa.

In a case where another print job is not being executed ("NO" in step S13) when the normal print request is received (when the normal print job is stored into the normal print spooler 11Aa), the main control portion 21 of the digital multifunction machine 1A causes the printer portion 25 to execute the normal print based on the normal print job (step S14).

Further, in a case where another print job is being performed ("YES" in step S13) when the normal print request is received, the main control portion 21 of the digital multifunction machine 1A sets a state in which a request of changing the print job in an execution waiting state existing in the spooler 11A can be received (step S15).

As the changing request for the print job in the execution waiting state, it is assumed that a request for changing a normal print job in the execution waiting state into a private print job of the digital multifunction machine 1A or a request for changing a normal print job in the execution waiting state into a print job (normal print job or private print job) of the other digital multifunction machine 1B or 1C is received.

In the above state, the user who wants to perform the changing process for the print job in the execution waiting state specifies an inquiry about the spooler state (or a changing request for the print job in the execution waiting state) by the control panel 22.

In a case where the user specifies the inquiry about the spooler state by the control panel 22, the main control portion 21 performs a display process of the spooler state which displays a guidance screen indicating the states of the respective print jobs stored in the spooler 11A of the digital multifunction machine 1A on the display portion 22a of the control panel 22 (step S17). Further, a display example displayed on the display portion 22a by the display process of the spooler state is explained in detail later.

When the spooler state is displayed on the display portion 22a by the display process of the spooler state, the main control portion 21 monitors whether the user instructs a change into a private print job by the control panel 22 or instructs the movement to the different digital multifunction machine 1B, 1C (steps S18, S21).

For example, when the user requests to the effect that the normal print job waiting for execution is changed into the private print by the control panel 22 ("YES" in step S18), the main control portion 21 performs the process of changing the normal print job of the user in the execution waiting state into the private print job of the user (step S19).

In the changing process of changing the normal print job in the execution waiting state into the private print job, the normal print job of the user stored in the normal print spooler 11Aa is moved to the private print spooler 11Ab as a private print job of the user. At this time, in the private print job, it is permissible to set a password or the like used to execute the private print job.

The print job changed from the normal print job to the private print job by the changing process as described above is executed as a private print process in response to an execution request from the user by the control panel 22 in the digital multifunction machine 1A (step S20).

Further, in a case where the user requests to the effect that the normal print job waiting for execution is changed into the different digital multifunction machine 1B, 1C by the control panel 22 ("YES" in step S21), the main control portion 21 performs the moving process of moving the normal print job of the user to the different digital multifunction machine 1B or 1C as a normal print job or private print job (step S22). In this case, the normal print job is executed as the normal print or private print by the digital multifunction machine 1B or 1C of the moving destination.

Further, in the state in which the spooler state is displayed, the main control portion 21 sequentially executes the normal print jobs in the normal print spooler 11Aa. Therefore, if the normal print job waiting for execution is set in a print order ("NO" in step S18, "NO" in step S21 and "NO" in step S13) while the change into the private print job and the movement to the different digital multifunction machine 1B, 1C are not instructed, the main control portion 21 executes the normal print job as the normal print.

Next, the display process of the spooler state is explained.

Figure 5:
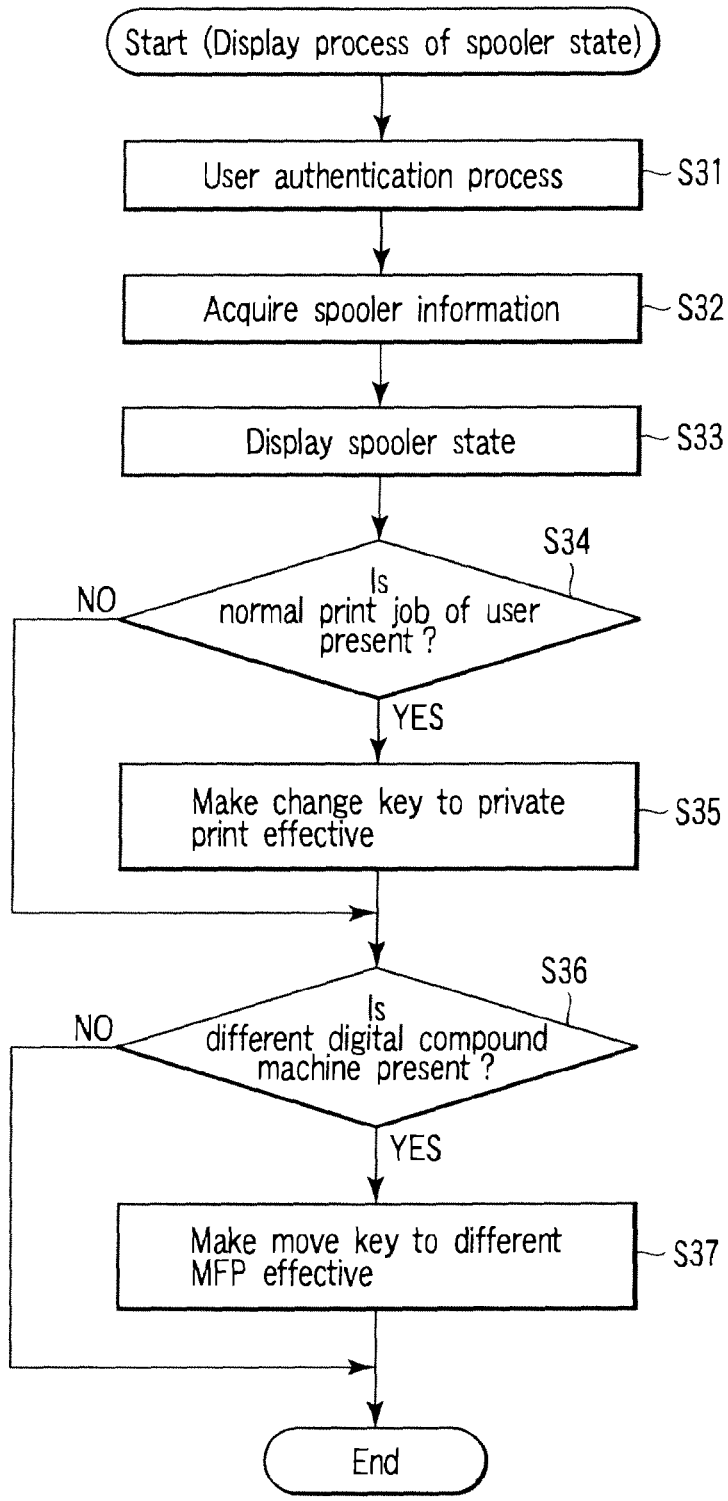
FIG. 5 is flowchart for illustrating a display process of a spooler state.

FIG. 5 is flowchart for illustrating the display process of the spooler state.

As described above, in a case where a normal print job in the execution waiting state is present, it is possible to display information (spooler state) indicating the state of print jobs accumulated in the spooler 11 on the display portion 22a of the control panel 22. The display process of the spooler state is performed according to the operation by the user in a state in which the changing process for the normal print job in the execution waiting state can be performed.

First, in a case wherein the changing process for the normal print job in the execution waiting state is performed, the user specifies an inquiry about the spooler state by the control panel 22. Then, the main control portion 21 performs the user authentication process to authenticate the user (step S31). The user is authenticated (specified) as an operator in the user authentication process.

For example, the main control portion 21 collates authentication data acquired from the operator with authentication data stored in the personal authentication database 27a (or 2a). When authentication data which coincides with the authentication data acquired from the operator is present in the personal authentication database 27a by collation, the main control portion 21 authenticates that the operator is the user of authentication data which has coincided.

Further, in the example of the configuration shown in FIG. 2, user information containing authentication data of the operator is acquired from an IC card as an authentication device which the operator has. That is, if the operator presents the IC card to the authenticating portion 23, the main control portion 21 acquires user information containing authentication data of the operator from the IC card by the authenticating portion 23. Further, the operator who presented the IC card D can input authentication data to authenticate the user by the control panel 22.

If the user as the operator is successfully authenticated by the user authentication process, the main control portion 21 acquires information (spooler information) indicating the state of the respective print jobs stored in the spooler 11 of the digital multifunction machine 1 (step S32). If spooler information of the spooler 11 is acquired, the main control portion 21 displays the display screen (display screen of the spooler state) indicating the spooler state of the spooler 11 based on the acquired spooler information on the display portion 22a of the control panel 22 (step S33).

Figures 6, 7:
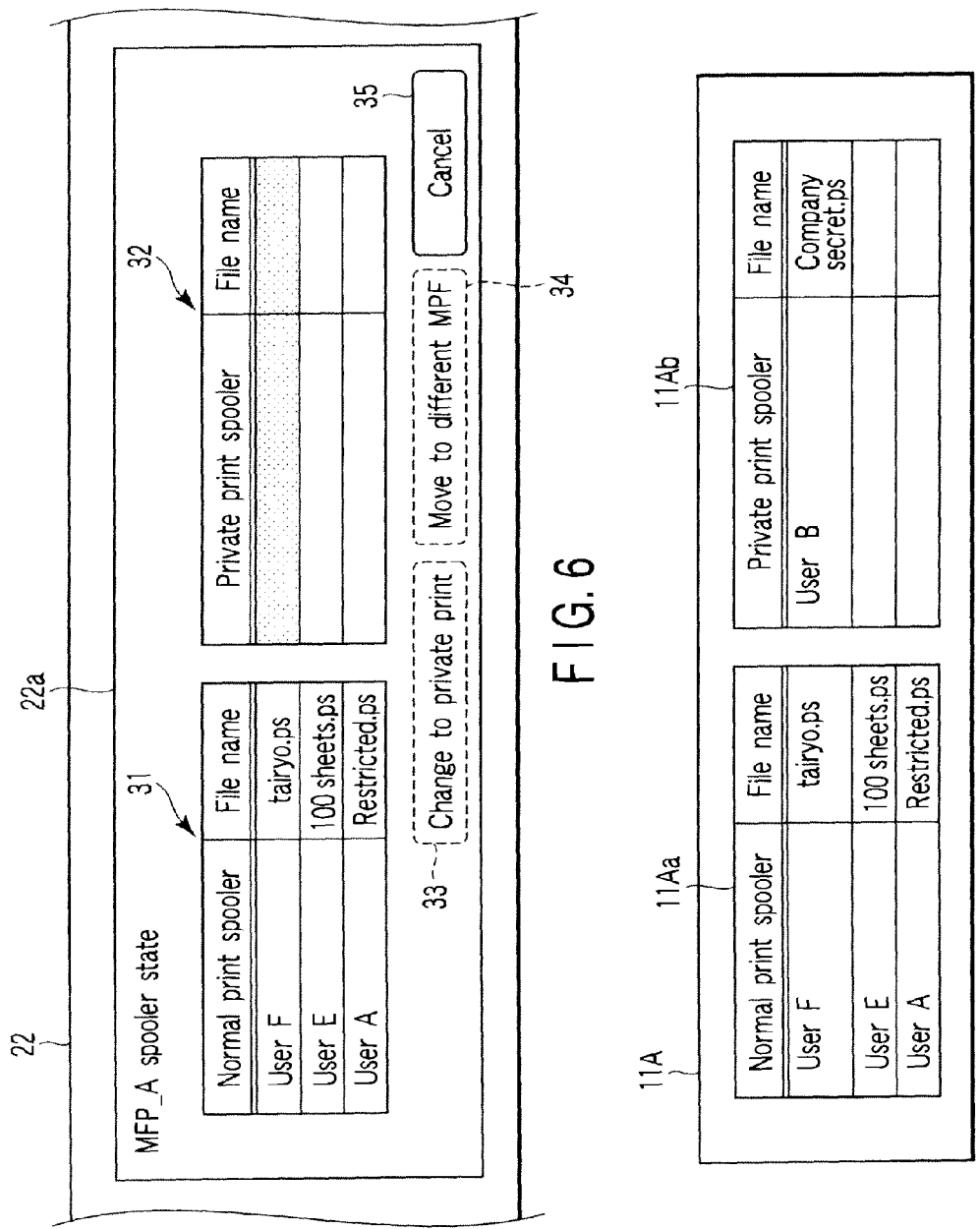
FIG. 6 is a view showing a display example of a display screen of a spooler state displayed on a display portion.
FIG. 7 is a diagram showing an example of a print job stored in a spooler.

FIG. 6 is a view showing a display example of the display screen of the spooler state displayed on the display portion. In the display example shown in FIG. 6, a display column 31 which displays normal print jobs stored in the normal print spooler 11a and a display column 32 which displays private print jobs stored in the private print spooler 11b are displayed.

In the display column 31, information indicating the user and information indicating print data are displayed for each normal print job. Further, the respective print jobs displayed in the display column 31 can be selected by the user by use of the touch panel of the display portion 22a.

Further, in the display column 32, information indicating the user and information indicating print data are displayed only for the private print job of the authenticated user. Further, in the display column 32, the private print job of the user other than the authenticated user is displayed so that only the presence of the private print job will be displayed and the contents of the print job cannot be understood.

Further, in the display example shown in FIG. 6, a change key 33, move key 34, cancel key 35 are displayed together with the spooler state described above.

The change key 33 is a key to permit the user to instruct that the normal print job waiting for execution of the user is changed to a private print job of the user. The move key 34 is a key to permit the user to instruct that the print job of the user is moved to a different digital multifunction machine. The cancel key 35 is a key to permit the user to instruct that the display screen of the spooler state is terminated.

In a state in which the above display screen of the spooler state is displayed on display portion 22a, the main control portion 21 determines whether the normal print job of the authenticated user in the execution waiting state is set in a selected state or not (step S34). By the above determination, the main control portion 21 determines whether the normal print job which the user can change to the private print job is set in a selected state or not.

When it is determined by the above determination that the normal print job of the user is set in the selected state ("YES" in step S34), the main control portion 21 sets a state in which the user can select the change key 33 to change the normal print job to a private print job (the change key 33 is made effective) (step S35).

Further, when it is determined by the above determination that the normal print job of the user waiting for execution is not set in the selected state ("NO" in step S34), the main control portion 21 sets a state in which the user cannot select the change key 33 to make a change to the private print job (the change key 33 is made ineffective) (step S35).

That is, in a case where the normal print job selected by the user in the display column 31 can be changed to the private print job, the change key 33 is set into a selectable state. Further, in a case where the user does not select the normal print job which can be changed to the private print job in the display column 31, the change key 33 is set into a non-selectable state.

For example, it is assumed the operator (authenticated user) can change only the normal print job of the user to a private print job. In this case, in a state in which the normal print job of the authenticated user is selected in the display column 31, the change key 33 is set into the selectable state.

Further, in a state in which the normal print job of the user is not selected in the display column 31, the change key 33 is set into the non-selectable state.

Further, in a state in which the display screen of the spooler state as described above is displayed on the display portion 22a, the main control portion 21 determines whether a state in which a print job which can be moved to a different digital multifunction machine communicable with the digital multifunction machine is selected is set or not (step S36). In the above determination, the main control portion 21 determines whether or not a different digital multifunction machine which is communicable with the digital multifunction machine exists and a print job which can be moved to the digital multifunction machines is set in the selected state.

Further, it is assumed that the main control portion 21 periodically (for example, for every several minutes) confirms a different digital multifunction machine which is communicable with the digital multifunction machine via the network 4. In this case, it is possible for the main control portion 21 to confirm a different digital multifunction machine on the network 4 which is communicable with the digital multifunction machine as required.

When it is determined by the above determination that a print job movable to the different digital multifunction machine is set in the selected state ("YES" in step S36), the main control portion 21 sets the move key 34 to move the print job set in the selected state to the different digital multifunction machine into a selectable state by the user (the move key 34 is made effective) (step S37).

Further, when it is determined by the above determination that a print job movable to the different digital multifunction machine is not selected ("NO" in step S36), the main control portion 21 sets the move key 34 into a non-selectable state by the user (the move key 34 is set ineffective) (step S37).

That is, the move key 34 is set in the selectable state when a print job set in the selected state in the display column 31 or display column 32 is movable to the different digital multifunction machine 1. Further, the move key 34 is set in the non-selectable state when a print job set in the selected state in the display column 31 or display column 32 cannot be moved to the different digital multifunction machine.

For example, it is assumed that the operator (authenticated user) can move only the normal print job of the user to the different digital multifunction machine 1. In this case, in a state in which a different digital multifunction machine communicable with the different digital multifunction machine exists and the normal print job of the authenticated user is selected in the display column 31, the move key 34 is set into the selectable state. Further, in a state in which a normal print job of the user is not selected in the display column 31, the move key 34 is set into the non-selectable state.

In the above display process of the spooler state, the spooler state is displayed on the display portion 22a in response to an operation by the authenticated user. As a result, the user can recognize the state inside the spooler of the digital multifunction machine.

Further, in the above display process of the spooler state, the change key to change the normal print job waiting for execution to a private print job and the move key to move the print job waiting for execution to a different digital multifunction machine are displayed together with the spooler state. The change key is made effective in a state in which a change to the private print job can be made and the move key is made effective in a state in which movement to a different digital multifunction machine can be made. Thus, the user can easily instruct the change process to the private print or the moving process to a different digital multifunction machine.

Next, the changing process to the private print is explained.

Figure 10:
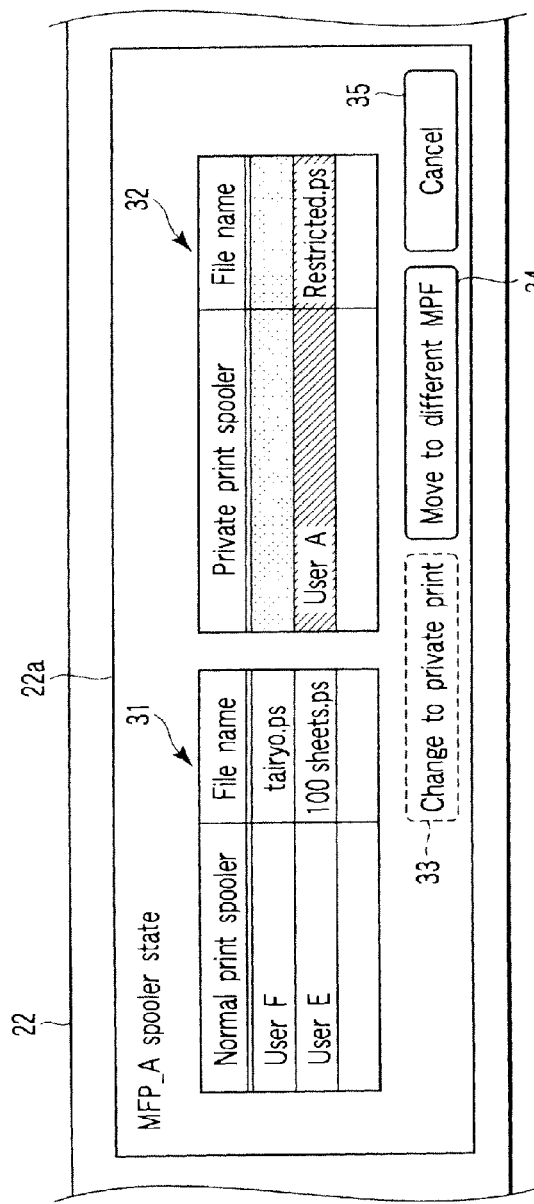
FIG. 10 is a view showing an example of a display screen of a spooler state displayed on the display portion.

FIG. 7 and FIG. 9 are diagrams showing examples of print jobs stored in the spooler 11. Further, FIG. 8 and FIG. 10 are views showing examples of display screens of spooler states displayed on the display portion 22a.

In this case, it is assumed that the digital multifunction machine 1A which has received a normal print request of a user A has stored the normal print job of user A in the normal print spooler 11Aa. Further, it is assumed that a normal print job of a user F, a normal print job of a user E and a private print job of a user B are stored in the spooler 11A of the digital multifunction machine 1A when it has received the normal print request of user A.

In such a case, as shown in FIG. 7, the normal print request of user A which the digital multifunction machine 1A has received is stored in the normal print spooler 11Aa as a normal print job which is printed next to the normal print job of user E and the normal print job of user F already stored in the normal print spooler 11Aa.

If user A requests an inquiry about the spooler state in this state, the main control portion 21 acquires information of each print job stored in the spooler 11A as shown in FIG. 7 and displays the display screen indicating the spooler state as shown in FIG. 6 on the display portion 22a.

If user A touches the normal print job of user A (the normal print job in the execution waiting state of user A) displayed in the display column 31 on the display screen of the spooler state as shown in FIG. 6, the main control portion 21 sets the normal print job of user A in the selected state as shown in FIG. 8 and sets the change key 33 into the effective state. On the display screen shown in FIG. 8, the change key 33 functions as a button to instruct that user A changes the normal print job of user A to the private print job of user A.

Further, when the normal print job of user A is selected and if a state in which it is communicable with another digital multifunction machine is set, the move key 34 is also set into an effective state as shown in FIG. 8. A normal state with respect to the different digital multifunction machine maybe confirmed when a print job waiting for execution is selected or may be confirmed by making an inquiry for each preset time. On the display screen shown in FIG. 8, the move key 34 functions as a button to instruct that user A moves the normal print job of user A to the different digital multifunction machine 1B or 1C.

Further, when the change key 33 is touched by user A on the display screen of the spooler state as shown in FIG. 8, the main control portion 21 moves the normal print job of user A in the selected state from the normal print spooler 11Aa to the private print spooler 11Ab as shown in FIG. 9. As a result, the normal print job of user A is deleted from the normal print spooler 11Aa in the spooler 11A as shown in FIG. 9 and stored in the private print spooler 11Ab.

Further, it is possible to set a password to execute the private print job in the private print job changed form the normal print job. For example, this is realized by displaying a setting screen to set the password on the display portion 22a when the change key 33 is touched.

When the normal print job of user A is changed to the private print job, the main control portion 21 displays the normal print job of user A which has been displayed on the display column 31 on the display column 32 as a private print job of user A as shown in FIG. 10. At this time, the main control portion 21 changes the change key 33 into the non-selectable state as shown in FIG. 10.

As described above, in the digital multifunction machine of the present embodiment, the normal print requests received from the external equipment are spooled as normal print jobs sequentially executed by the printer, the private print requests received from the external equipment are spooled in the spooler as private print jobs executed by the printer according to an instruction by the user who has requested the private print, and the normal print job of the user in the execution waiting state spooled in the spooler is changed into a private print job of the user in response to a request from the user authenticated by the user authenticating portion.

Thus, in a case where the print process of the other user is performed, the normal print can be changed to the private print in response to the request of the user. For example, the user who requests the normal print of a highly confidential document to the digital multifunction machine can change the print of the document to the private print if the digital multifunction machine is performing the print process of another user. As a result, the user can easily attain the security of the print by himself. Further, the possibility that he forgets to take away his own print result and it is erroneously taken away by another user due to elongation of the waiting time until the print is performed is reduced.

Next, the moving process to another digital multifunction machine is explained.

Figure 11:
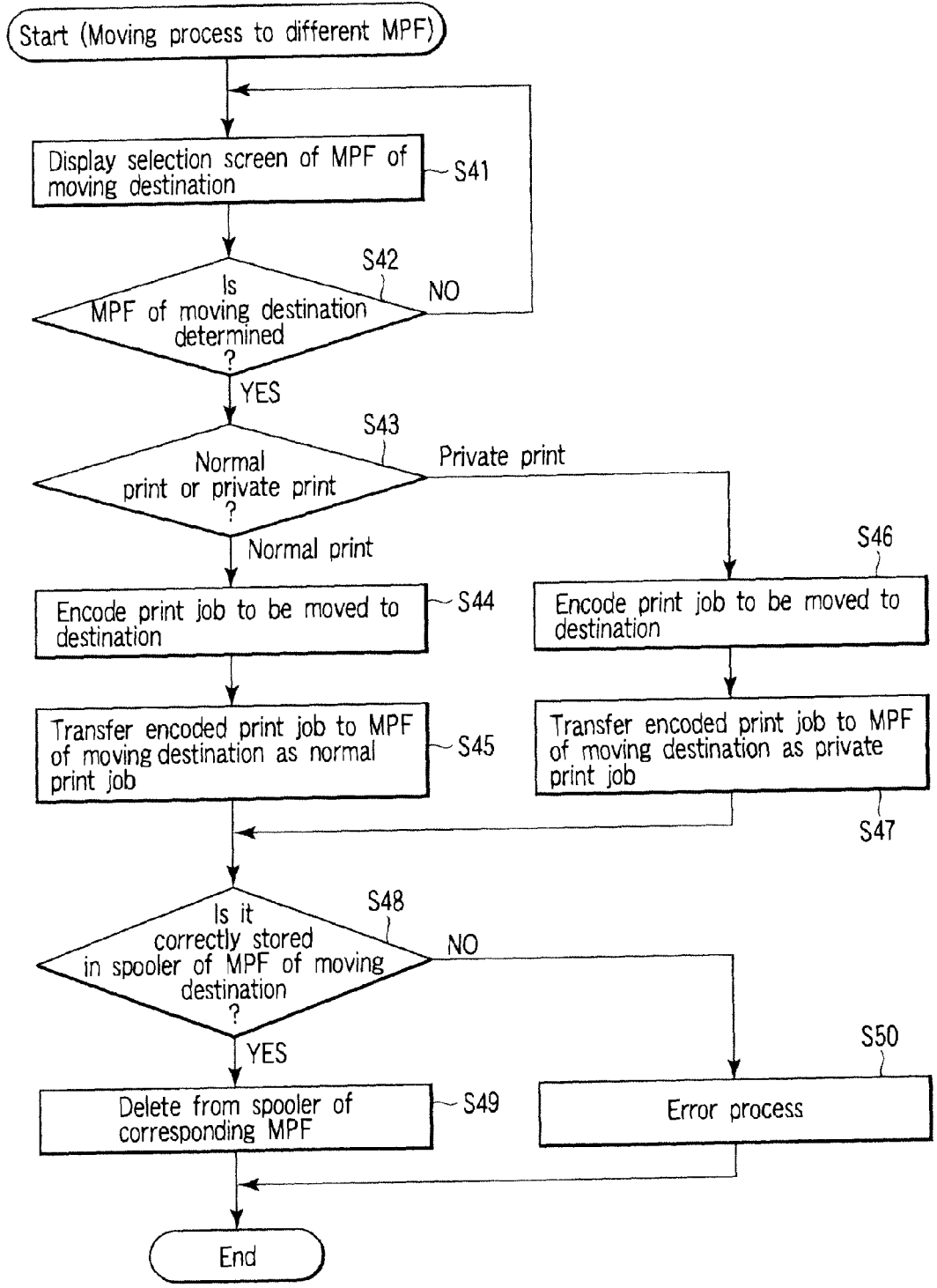
FIG. 11 is a flowchart for illustrating a process of moving a normal print job in an execution waiting state to another digital multifunction machine.

FIG. 11 is a flowchart for illustrating the moving process to another digital multifunction machine of moving a normal print job in the execution waiting state to the other digital multifunction machine. Further, the process shown in FIG. 11 is a process corresponding to the step S22. The process shown in FIG. 11 shows an example of the process in a case where the move key 34 is touched by the user in a state in which the print job is selected on the display screen of the spooler state.

That is, if the move key 34 is touched in a state in which the print job of the user is selected on the display screen of the spooler state, the main control portion 21 displays a selection screen (selection screen of the moving destinations) to select a different digital multifunction machine as the moving destination of the print job (the print job of the digital multifunction machine selected by the user) (step S41).

The selection screen of the moving destinations is an operation screen to permit the user to select a digital multifunction machine used as the moving destination of the print job selected by the user. Further, on the selection screen of the moving destinations, the user is permitted to select whether the print job is moved to a digital multifunction machine of the moving destination as a private print job or it is moved as a normal print job.

In a state in which the selection screen of the moving destinations is displayed on the display portion 22a, the user selects either the normal print job or the private print job and selects a digital multifunction machine of the moving destination. When the digital multifunction machine of the moving destination is selected ("YES" in step S42), the main control portion 21 performs a process of moving the print job to the selected digital multifunction machine of the moving destination as a normal print job or private print job (steps S43 to S50).

If it is selected that the print job selected by the user is moved to the digital multifunction machine of the moving destination as a normal print job on the selection screen of the moving destinations (normal print in step S43), the main control portion 21 performs a process of moving the print job of the digital multifunction machine selected by the user to the digital multifunction machine of the moving destination as a normal print job (steps S44 to S45 and S48 to S50).

That is, when it is selected that it is moved as the normal print (normal print in step S43), the main control portion 21 encodes the print job (print job to be moved) containing printing data selected by the user by the encoding/decoding portion 28 (step S44). In the encoding process, the print job is encoded by use of a decodable encoding system by the digital multifunction machine of the moving destination. This is because the digital multifunction machine of the moving destination performs a print process for the print job as a normal print job.

When the print job to be moved is encoded, the main control portion 21 transfers the print job to the digital multifunction machine of the moving destination via the network interface 24 to store the same as a normal print job (step S45). Thus, the print job is transferred on the network 4 in an encoded state. In this case, when the print job is moved as the normal print job, the encoding process of the print job to be moved may be omitted.

The main control portion 21 of the digital multifunction machine of the moving destination which has received the encoded print job to be stored as the normal print job decodes the print job encoded by the encoding/decoding portion 28. When the received print job is decoded by the encoding/decoding portion 28, the main control portion 21 of the digital multifunction machine of the moving destination stores the decoded print job into the spooler 11 of the digital multifunction machine of the moving destination as a normal print job. That is, in the digital multifunction machine of the moving destination, the decoded print job is stored into the normal print spooler 11a. If the received print job is correctly stored in the normal print spooler 11a as the normal print job, the main control portion 21 of the digital multifunction machine of the moving destination notifies a response indicating that the print job is correctly stored to the digital multifunction machine of the moving source.

Further, when it is selected that the print job selected by the user is moved to the digital multifunction machine of the moving destination as the private print on the selection screen of the moving destinations (private print in step S43), the main control portion 21 performs a process of moving the print job of the digital multifunction machine selected by the user to the digital multifunction machine of the moving destination as a private print job (steps S46 to S50).

That is, if it is selected that it is moved as the private print (private print in step S43), the main control portion 21 encodes the print job (print job to be moved) containing printing data selected by the user by the encoding/decoding portion 28 (step S46).

For the encoding process, various encoding systems can be applied. In this case, for example, it is assumed that an encoding system of encoding the print job by use of a public key of the user is applied as the encoding process. In this case, the digital multifunction machine of the moving destination acquires a secret key of the user to decode the print job. The secret key of the user may be acquired at the time of the user authentication process for the user in the digital multifunction machine of the moving destination. For example, the digital multifunction machine of the moving destination may acquire the secret key of the user from an IC card as an authentication device which the user presents by the authenticating portion 23.

If the print job to be moved is encoded, the main control portion 21 transfers the print job to the digital multifunction machine of the moving destination so as to register the same as a private print job (step S47). Thus, the print job is transferred on the network 4 in an encoded state.

The main control portion 21 of the digital multifunction machine of the moving destination which has received a print job to be stored as a private print job in an encoded state stores the print job with the encoded state kept in the spooler 11 as a private print job. That is, the main control portion 21 of the digital multifunction machine of the moving destination stores the received print job in the private print spooler 11*b* with the encoded state kept. If the received print job is correctly stored in the spooler as the private print job, the main control portion 21 of the digital multifunction machine of the moving destination notifies a response indicating that the print job is correctly stored to the digital multifunction machine of the moving source.

If the print job is transferred to the digital multifunction machine of the moving destination in step S45 or S47, the main control portion 21 of the digital multifunction machine of the moving source determines whether or not the print job is correctly stored in the spooler 11 of the digital multifunction machine of the moving destination (step S46). This is determined based on a response from the digital multifunction machine of the moving destination. That is, the main control portion 21 determines whether or not the print job is correctly stored in the spooler 11 of the digital multifunction machine of the moving destination based on a response from the digital multifunction machine of the moving destination. For example, when receiving a response indicating that it is correctly stored from the digital multifunction machine of the moving destination, the main control portion 21 determines that the print job is correctly stored in the spooler 11 of the digital multifunction machine of the moving destination.

When it is determined by the above determination that it is correctly stored in the spooler of the digital multifunction machine of the moving destination ("YES" in step S48), the main control portion 21 deletes the print job which has been transferred to the digital multifunction machine of the moving destination from the spooler of the digital multifunction machine (step S49). As a result, the print job selected by the user is moved from the spooler of the digital multifunction machine to the spooler of a different digital multifunction machine.

Further, when it is determined that the print job could not be moved to the digital multifunction machine of the moving destination, the main control portion 21 performs an error process of determining the moving process as an error (step S50). In this case, for example, the main control portion 21 may guidance-display to the effect that the print job could not be moved on the display portion 22*a* as an error process.

Further, as described above, when a print job moved as the private print is encoded by use of a public key encoding system, the print job is encoded by the public key of the user in the digital multifunction machine of the moving source. The encoded print job is transferred from the digital multifunction machine of the moving source to the digital multifunction machine of the moving destination via the network 4.

The digital multifunction machine of the moving destination stores the print job encoded by the public key of the user in the spooler 11 in the encoded state as a private print job (stores the print job in the encoded state in the private print spooler 11*a*). In the digital multifunction machine of the moving destination, the private print job is decoded by the secret key of the user acquired from the user in the authentication process for the user. In the digital multifunction machine of the moving destination, the decoded private print job is executed in response to an execution request of the user. Thus, the print job moved as the private print is protected.

Next, an example of a process in a case where the print job is moved from the digital multifunction machine 1A to the digital multifunction machine 1B is explained.

FIG. 12A is a diagram showing an example of the print job stored in the spooler 11A of the digital multifunction machine 1A (the digital multifunction machine of the moving source) before the moving process. FIG. 12B is a diagram showing an example of a print job stored in the spooler 11B of the digital multifunction machine 1B (the digital multifunction machine of the moving destination) before the moving process.

In the example shown in FIG. 12A, a normal print job of user F, a normal print job of user E and a normal print job of user A are stored in the normal print spooler 11Aa and a private print job of user B is stored in the private print spooler 11Ab in the spooler 11A of the digital multifunction machine 1A. Further, in the example shown in FIG. 12B, the normal print job is not present in the normal print spooler 11Ba and a private print job of user D is stored in the private print spooler 11Bb in the spooler 11B of the digital multifunction machine 1B.

In this state, if user A requests an inquiry about the spooler state in the digital multifunction machine 1A, the main control portion 21 of the digital multifunction machine 1A acquires information of the respective print jobs stored in the spooler 11A as shown in FIG. 12A and displays a display screen indicating the spooler state as shown in FIG. 6 on the display portion 22*a*.

If user A touches the normal print job of user A displayed in the display column 31 on the display screen of the spooler state as shown in FIG. 6, the main control portion 21 sets the normal print job of user A into a selected state as shown in FIG. 8 to set the change key 33 and move key 34 into an effective state. If user A touches the move key 34 on the display screen of the spooler state as shown in FIG. 8, the main control portion 21 of the digital multifunction machine 1A displays a selection screen of the moving destinations on the display portion 22*a*.

FIG. 13 is a view showing a display example of the selection screen of the moving destinations. In this case, it is assumed that the digital multifunction machine 1A is set in a state in which it is communicable with the digital multifunction machines 1B and 1C.

On the selection screen of the moving destinations shown in FIG. 13, a selection key 41 to select a first moving destination, a selection key 42 to select a second moving destination, a normal print key 43, a private print key 44 and the like are displayed together with guidance to the effect that "To which digital multifunction machine is it moved?".

The selection key 41 is a touch key to select the digital multifunction machine 1B as the moving destination of the print job. The selection key 42 is a touch key to select the digital multifunction machine 1C as the moving destination of the print job. The normal print key 43 is a touch key to select that the print job is moved as a normal print job to the digital multifunction machine of the moving destination. The private print key 44 is a touch key to select that the print job is moved to the digital multifunction machine of the moving destination as confidential Confidential.

If the selection key 41 (or selection key 42) is touched by the user on the above selection screen of the moving destinations in a state in which the normal print key 43 is selected, the main control portion 21 performs a process of moving the print job (the print job set into the selected state in FIG. 8) as a normal print job to the digital multifunction machine 1B (or digital multifunction machine 1C).

Further, if the selection key 41 (or selection key 42) is touched by the user on the above selection screen of the moving destinations in a state in which the private print key 44 is selected, the main control portion 21 performs a process of moving the print job as a private print job to the digital multifunction machine 1B (or digital multifunction machine 1C).

Here, as shown in FIG. 13, it is assumed that the selection key 41 is touched by the user in a state in which the private print key 44 is selected. In this case, the main control portion 21 performs a process of moving the print job (normal print job of user A of the digital multifunction machine 1A selected on the screen shown in FIG. 8) as a private print job to the digital multifunction machine 1B.

FIG. 14A is a diagram showing an example of a print job stored in the spooler 11A of the digital multifunction machine 1A (the digital multifunction machine of the moving source) after the moving process. FIG. 14B is a diagram showing an example of a print job stored in the spooler 11B of the digital multifunction machine 1B (the digital multifunction machine of the moving destination) after the moving process. That is, FIG. 14A and FIG. 14B show states in which the normal print job of user A of the spooler 11A shown in FIG. 12A is moved as a private print job to the spooler 11B shown in FIG. 12B.

In the example shown in FIG. 14A, the normal print job of user F and the normal print job of user E are stored in the normal print spooler 11Aa and the private print job of user B is stored in the private print spooler 11Ab in the spooler 11A of the digital multifunction machine 1A. Further, in the example shown in FIG. 14B, the normal print job is not present in the normal print spooler 11Ba and the private print job of user D and the private print job of user A are stored in the private print spooler 11Bb in the spooler 11B of the digital multifunction machine 1B.

That is, in FIG. 14A, the normal print job of user A stored in the normal print spooler 11Aa of the spooler 11A shown in FIG. 12A is deleted. Further, in FIG. 14B, the private print job of user A is stored in the private print spooler of the spooler 11B shown in FIG. 12B. This means that the normal print job of user A stored in the spooler 11A is moved to the spooler 11B as the private print job of user A.

Figure 15:
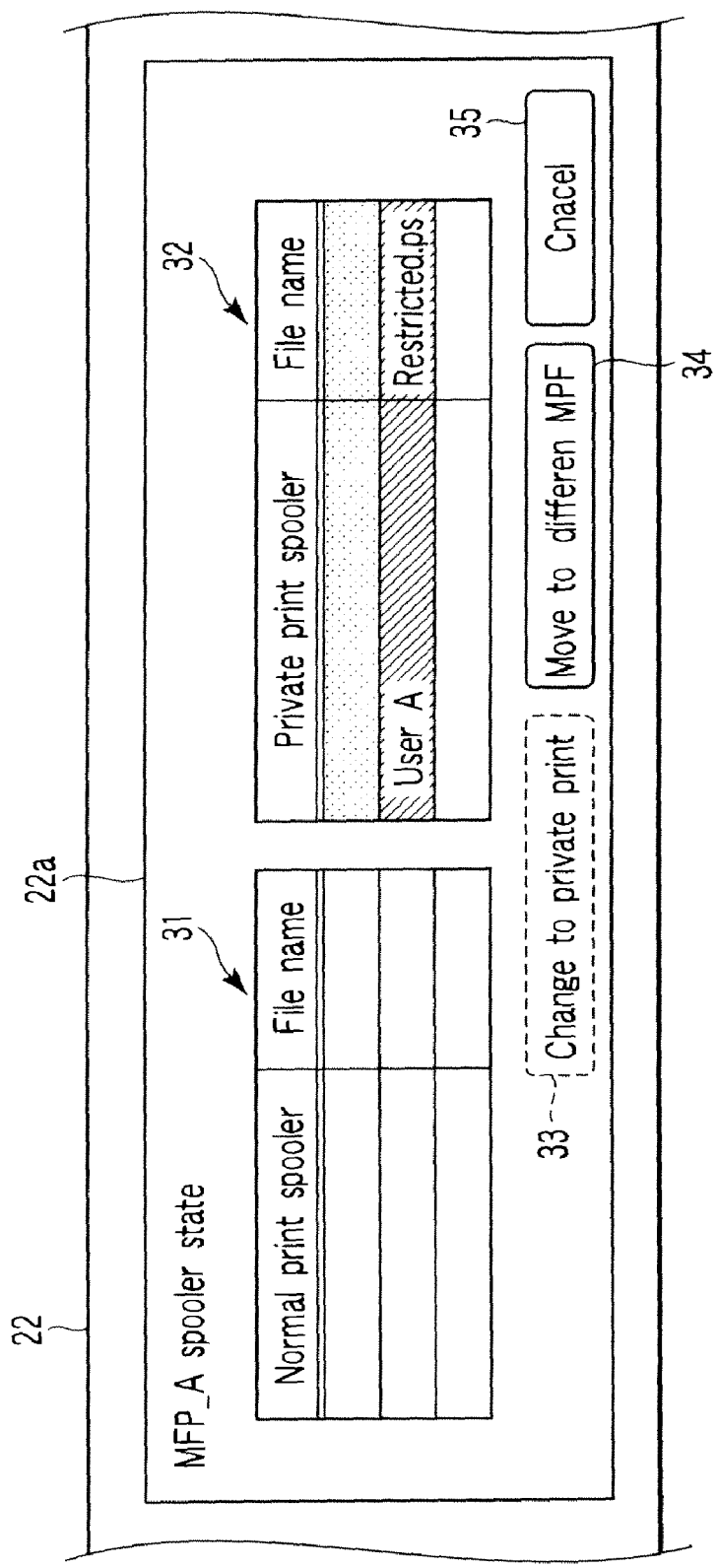
FIG. 15 is a view showing an example of a display screen of a spooler state displayed on the display portion.

FIG. 15 is a view showing an example of a display screen of a spooler state indicating the state of the print jobs stored in the spooler 11B shown in FIG. 14B.

By the above moving process, the spooler 11A and spooler 11B are respectively changed as shown in FIG. 14A and FIG. 14B. In this case, if the display process of the spooler state is performed in the digital multifunction machine 1B, the display screen of the spooler state as shown in FIG. 15 is displayed on the display portion 22a of the digital multifunction machine 1B.

As described above, the digital multifunction machine of the present embodiment spools a print request received from the external equipment in the spooler as a print job to be executed by the printer and moves a print job in the execution waiting state of the user spooled in the spooler to the spooler of a different digital multifunction machine in response to a request from the user authenticated by the user authenticating portion.

Thus, when the print process of another user is being performed, the normal print of the user can be changed to a print job of a different digital multifunction machine in response to a request of the user. For example, the user who has requested the normal print of a highly secret document from the digital multifunction machine can permit a different digital multifunction machine to perform the print of the document if the digital multifunction machine is performing the print process of another user. As a result, the user can easily attain the security of the print by himself. Further, the possibility that he forgets to take away his own print result and it is erroneously taken away by another user due to elongation of the waiting time until the print is performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a user authenticating device which authenticates a user,
an interface which performs data communication with another image forming apparatus and which receives a print job from external equipment;
a spooler which spools the print job received by the interface,
a printer which prints out the print job spooled in the spooler,
a display which displays the print job stored in the spooler, and, a move key to permit the user instruct that the print job is moved to another image forming apparatus, and
a controller which determines whether to move a print job in an execution waiting state to another image forming apparatus as a normal print job or move the print job to another image forming apparatus as a private print job in case where the move key is input, and transfers the print job to the another image forming apparatus via the interface in accordance with the determination.

2. The apparatus according to claim 1, wherein the display displays a selection key of the transferred image forming apparatus of the print job stored in the spooler.

3. The apparatus according to claim 2, wherein the display displays a selection key to select whether to move as a normal print or a private print.

4. The apparatus according to claim 1, wherein the controller is configured to move the print job in an execution waiting state to another image forming apparatus if another print job spooled in the spooler is executed.

5. The apparatus according to claim 1, wherein the controller is configured to determine whether the print job is correctly transferred to the another image forming apparatus and deletes the print job from the spooler.

6. An image forming method comprising:
authenticating a user,
performing data communication with another image forming apparatus and which receives a print job from external equipment,
spooling the print job in a spooler received from external equipment,
printing out the print job spooled in the spooler,
displaying the print job stored in the spooler, and a move key to permit the user instruct that the print job is moved to another image forming apparatus,
determining whether to moves print job in an execution waiting state to another image forming apparatus as a normal print job or move the print job to another image forming apparatus as a private print job in case where the move key is input, and
transferring the print job in an execution waiting state of the user spooled in the spooler to the another image forming apparatus in response to an input to the move key in accordance with the determination.

7. The method according to claim 6, further comprising displaying a selection key of the transferred image forming apparatus of the print job stored in the spooler.

8. The method according to claim 7, further comprising displaying the transferred image forming apparatus and a selection key to select whether to move as a normal print or a private print.

9. The method according to claim 6, wherein the moving is to move the print job in an execution waiting state to another image forming apparatus if another print job spooled in the spooler is executed.

10. The method according to claim 6, further comprising determining whether the print job is correctly transferred to the another image forming apparatus and deleting the print job from the spooler.

11. The image forming apparatus according to claim 1, further comprising an encoder encodes the print job by use of a decodable encoding system by the another image forming apparatus, if it is determined that the print job is moved as the normal print job.

12. The image forming apparatus according to claim 1, further comprising an encoder encodes the print job by use of a public key of the user, if it is determined that the print job is moved as the private print job.

13. The image forming method according to claim 6, further comprising encoding the print job by use of a decodable encoding system by the another image forming apparatus, if it is determined that the print job is moved as the normal print job.

14. The image forming method according to claim 6, further comprising encoding the print job by use of a public key of the user, if it is determined that the print job is moved as the private print job.

* * * * *